United States Patent
Anubhai et al.

(10) Patent No.: US 11,227,009 B1
(45) Date of Patent: Jan. 18, 2022

(54) TEXT DE-OBFUSCATION WITH IMAGE RECOGNITION OF TEXT

(71) Applicant: Amazon Technologies, Inc., Seattle, WA (US)

(72) Inventors: Rishita Rajal Anubhai, Seattle, WA (US); Sravan Babu Bodapati, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 276 days.

(21) Appl. No.: 16/588,117

(22) Filed: Sep. 30, 2019

(51) Int. Cl.
*G06K 9/32* (2006.01)
*G06F 16/583* (2019.01)
*G06F 21/14* (2013.01)
*G06F 16/58* (2019.01)
*G06K 9/62* (2006.01)

(52) U.S. Cl.
CPC ...... *G06F 16/5862* (2019.01); *G06F 16/5866* (2019.01); *G06F 21/14* (2013.01); *G06K 9/325* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 10,169,315 | B1 * | 1/2019 | Heckel | G06N 3/0454 |
| 11,017,173 | B1 * | 5/2021 | Lu | G06N 20/00 |
| 2019/0213601 | A1 * | 7/2019 | Hackman | G06N 3/084 |
| 2021/0042474 | A1 * | 2/2021 | Liu | G06K 9/46 |

OTHER PUBLICATIONS

Shimada, D.—"Document Classification through Image-Based Character Embedding and Wildcard Training"—IEEE 2016, pp. 3922-3927 (Year: 2016).*
Sun, C.—"VCWE: Visual Character-Enhanced Word Embeddings"—NAACL-HLT Jun. 2019, pp. 2710-2719 (Year: 2019).*
Liu, F.—"Learning Character-level Compositionality with Visual Features"—arXiv May 2017, pp. 1-10 (Year: 2017).*
Giannakopoulos et al., "Unsupervised Aspect Term Extraction with B-LSTM & CRF using Automatically Labelled Datasets", Proceedings of the 8th Workshop on Computational Approaches to Subjectivity, Sentiment and Social Media Analysis, arXiv: 1709.05094v1, Sep. 15, 2017, 9 pages.

* cited by examiner

*Primary Examiner* — Bernard Krasnic
(74) *Attorney, Agent, or Firm* — Nicholson De Vos Webster & Elliott LLP

(57) ABSTRACT

Techniques are described for a de-obfuscation framework that utilizes image recognition of text. A word input by a user is received by the de-obfuscation service. Visual feature data associated with an image corresponding to each character of the word is generated. Word embeddings are generated using the visual feature data and each character of the word using a character encoder layer. Feature vectors are generated from the word embedding by combining the generated word embeddings and a provided word embedding using a second neural network. The generated feature vector is classified. Potential text obfuscation is detected from the classified generated feature vector using a lexicon to determine de-obfuscated text closet to the user text.

20 Claims, 14 Drawing Sheets

```
{
  "w0m3n" : "women",
   "l33t" : "leet",
   "1337" : "leet", # Note there can be two for the same actual word too
   "t3h" : "the",
   "C@7L0vr" : "CatLover",   ...
}
```

*FIG. 10*

```
{
  "w0m3n" : "ocean",
  "l33t" : "headband",    "1337" : "whom", # Note there can be two for the same actual word too
  ...
}
```

FIG. 11

US 11,227,009 B1

TEXT DE-OBFUSCATION WITH IMAGE RECOGNITION OF TEXT

BACKGROUND

As a general class of computer vision, image recognition of text can be implemented using image processing and machine learning. Machine learning relies on patterns and inferences used to make predictions. Machine learning is based on algorithms and statistical models executed by computer systems and can be found in applications such as data encryption, virtual personal assistants, and online customer support among others.

BRIEF DESCRIPTION OF DRAWINGS

Various embodiments in accordance with the present disclosure will be described with reference to the drawings, in which:

FIG. 10 is an example lexicon illustrating positive examples according to some embodiments.

FIG. 11 is an example lexicon illustrating negative examples according to some embodiments.

DETAILED DESCRIPTION

Various embodiments of methods, apparatus, systems, and non-transitory computer-readable storage media are described for a de-obfuscation framework that utilizes text and image recognition to detect obfuscation of text. According to some embodiments, a word input by a user is received by a de-obfuscation service. Visual feature data associated with an image corresponding to each character of the word is generated. Word embeddings are generated using the visual feature data and each character of the word using a character encoder layer (e.g., a sequence encoder layer) of a neural network. Feature vectors are generated from the word embeddings by combining the generated word embeddings and a provided word embedding using a word encoder layer (e.g., a sequence encoder layer) of the neural network model. Text obfuscation of the word is detected using a classifier and providing the user text, the visual character embedding, and/or combined the word embedding to a lexicon to determine text closet to the user text.

Various social media and opinion platforms use automated tools to detect and/or eliminate abusive language, hate speech, and sexual language. In many existing systems, abusers can evade these types of automated tools and natural language processing algorithms through the use of obscured text. For example, abusers may use non-standard forms of text to circumvent word filters, such as through the use of "leetspeak" which often replaces characters using reflectively similar characters (such as using "3" for "e", etc.). Common forms of obfuscation include typos, missing spaces between words, and changing the letter to numbers or Greek symbols.

In contrast to existing natural language processing strategies, the embodiments described herein advantageously de-obfuscate such abusive speech by, for example, treating each character as an image and processing the image to recognize the closest letter to it. As such, image recognition of text may be an important component of a de-obfuscation service, in particular, for maintaining various social media and opinion platforms in which abusive language, hate speech, and sexual language are used, but obfuscated.

Figure 1:
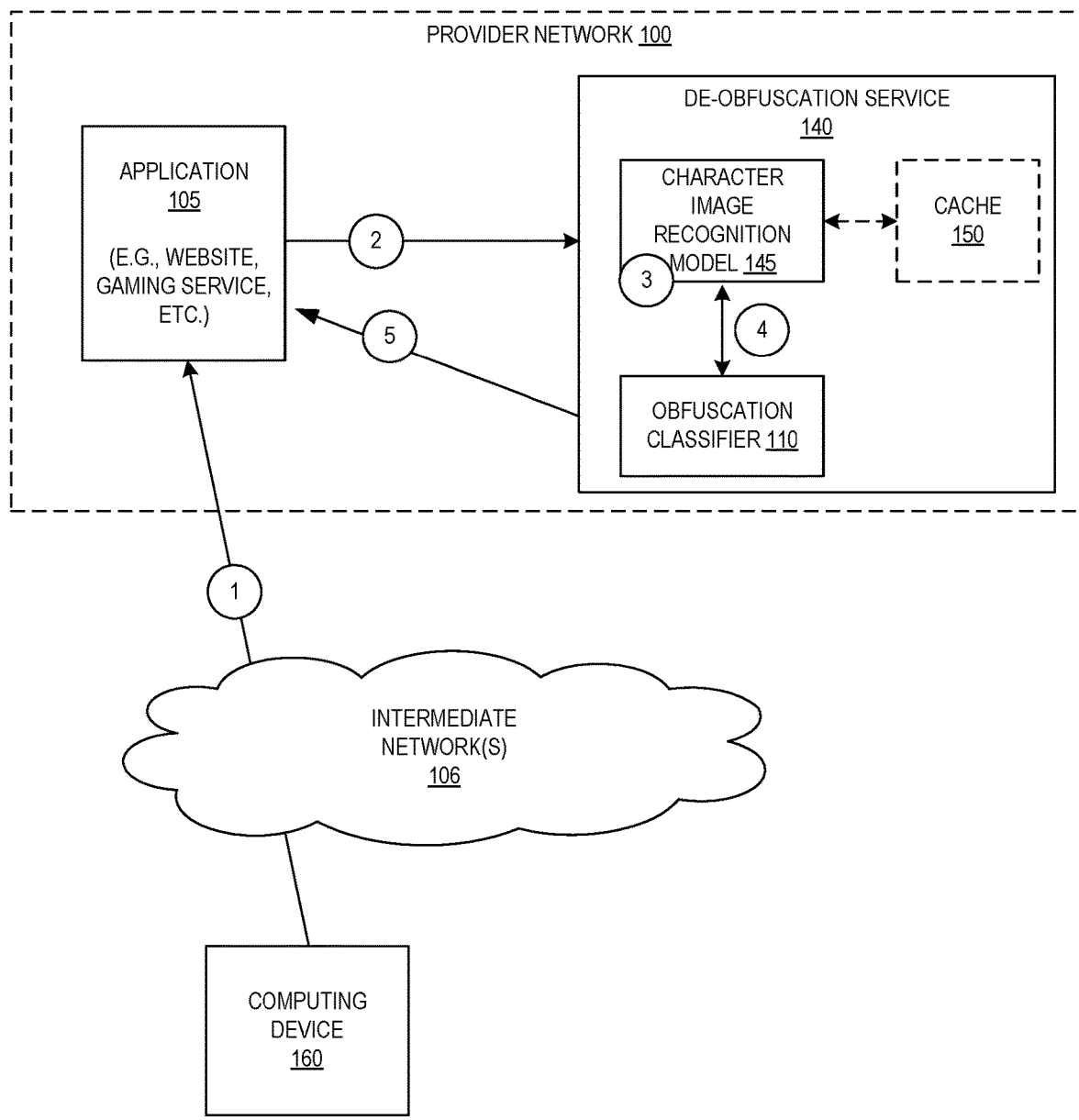
FIG. 1 is a diagram illustrating an environment for an example obfuscation system including a neural network according to some embodiments.

FIG. 1 is a diagram illustrating an environment for performing de-obfuscation according to some embodiments. As shown in FIG. 1, a de-obfuscation service 140 may include an obfuscation classifier 110 and a character image recognition model 145, and other optional components including a cache 150. As used herein, the term "de-obfuscation service" may be used to refer to a system structured to utilize text and image recognition to detect obfuscation of a word, phrase, or other text. For example, applications may utilize a de-obfuscation service to detect abusive language, hate speech, sexual language, etc., that may be present in an item of user-generated content. The de-obfuscation service 140 may be implemented using software, hardware, or a combination of both.

At a high level, the de-obfuscation service 140 receives one or more words (e.g., the word "w0m3n") and de-obfuscates it (that is, determines what the word was supposed to be or represent) using the words themselves, characters of the words, and information relating to an image of each character. The words may be input (e.g., keyed in or audibly provided) by a user into a computing device (e.g., the computing device 160) and supplied to an application 105 (such as a website, gaming service server, etc.) at circle 1. For example, a user of an online gaming platform may type a comment during gameplay and that comment would be checked, by the application 105, for obfuscated words.

The application 105 calls the de-obfuscation service 140 to analyze the input text at circle 2, for example, by sending a request message to the de-obfuscation service 140 that includes the input text. The application 105 may be implemented within a provider network 100 (e.g., as a software application executed by a hardware virtualization service or code execution service) or outside of a provider network. Similarly, the de-obfuscation service 140 may be implemented within a multi-tenant provider network 100 or in another, non-multi-tenant environment.

As noted, the text de-obfuscation service 140 treats each character (e.g., the characters "w", "0", "m", "3", and "n") as an image and evaluates the image to recognize the closest letter to that character in the image. In some embodiments, the de-obfuscation service 140 utilizes a character image recognition model 145 to generate feature data for each character of a word of the input text at circle 3. In some embodiments, the character image recognition model 145 is a Visual Geometry Group (VGG) network, MNIST database (Modified National Institute of Standards and Technology database), or other character recognition network, image recognition network, or a combination thereof. In some embodiments, the visual feature data is cached (e.g., by the cache 150) or stored in memory, a lookup, etc. for subsequent use.

The image feature data generated by the character image recognition model 145 is supplied by the de-obfuscation service to the obfuscation classifier 110 to be used along with the characters and words themselves to determine obfuscation at circle 4. The obfuscation classifier 110 uses a multi-layered approach to determining text obfuscation. A character encoder layer of the obfuscation classifier 110 utilizes visual character embeddings and the visual feature data to generate, per word of the text, a word embedding vector. The generated word embedding vector and a provided word embedding vector are combined (e.g., concatenated) and then used as an input into a word encoder layer which generates a feature vector for the word. Text obfuscation of the word is detected via a classifying layer using the generated feature vector and a result is passed to the application 105 at circle 5, which may include an indication that the text received is or is not an obscured representation of another word.

Examples of a de-obfuscation service (e.g., the de-obfuscation service 140) are described in more detail in sections hereinafter.

The obfuscation classifier 110 looks at one or more words in text and determines if any of the one or more words are obfuscated. In particular, the obfuscation classifier 110 will use visual character embeddings and information about images of the characters in making this determination. In some embodiments, the obfuscation classifier 110 uses one or more recurrent neural networks such as, but not limited to, a long short-term memory (LSTM) network. In some embodiments, the obfuscation classifier 110 may include one or more cells (the memory part of the LSTM) and one or more gates. For example, the obfuscation classifier 110 may include an input gate, an output gate, and a forget gate that control the direction of data into and out of the cell.

In some embodiments, one or more of the applications 105 and/or de-obfuscation service 140 is provided by one or more components of a provider network 100 (or, "cloud" provider network). A provider network 100 provides its users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks may utilize one or more user accounts that are associated with a customer account, though these terms may be used somewhat interchangeably depending upon the context of use. Users may interact with a provider network across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code —typically without the user having any control of or knowledge of the underlying compute instance(s) involved.

Figure 2:
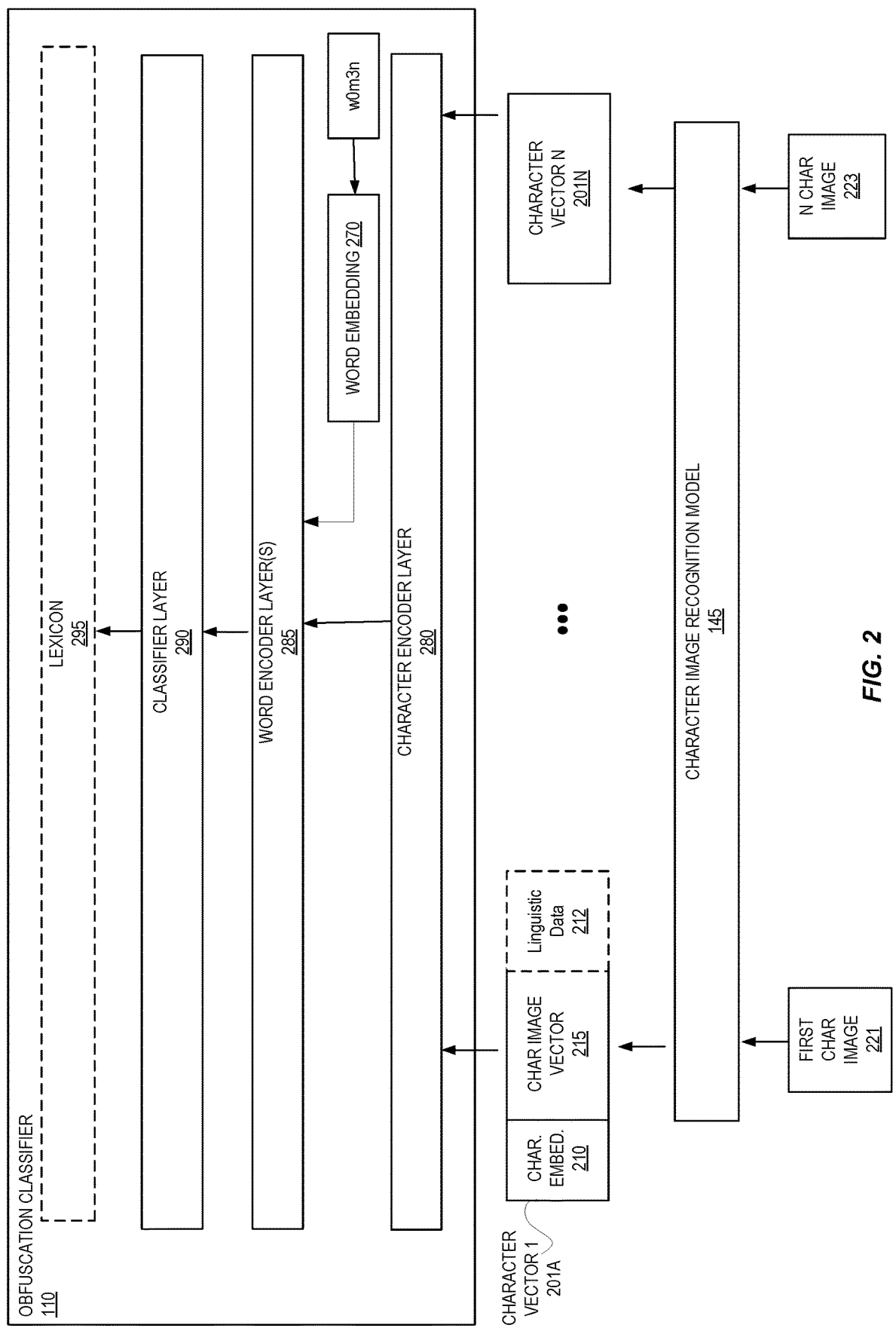
FIG. 2 is a diagram illustrating an example of a de-obfuscation service to detect text obfuscation according to some embodiments.

FIG. 2 is a diagram illustrating aspects of a de-obfuscation service according to some embodiments. As noted above, the de-obfuscation service 140 intakes one or more words and provides an indication of whether the one or more words are obfuscated. As detailed above, the de-obfuscation service 140 uses a two-layer feature generating architecture to generate feature vectors for each of the one or more words received and a classifier layer to look for de-obfuscation.

In the example of FIG. 2, the de-obfuscation service 140 is evaluating the word "w0m3n". To a person it is clear that "w0m3n" is equivalent to "women", but that may not be clear to an automated system. As noted above, the obfuscation classifier 110 uses a multi-layer approach to determine when a word is obfuscated.

A first layer is a character encoder layer 280 which evaluates a character vector 201A-201N associated with each character of a word. A character vector 201A for the first character is shown in greater detail. A first part of the character vector 201A is an embedding vector 210 for the character. For example, if the word being evaluated is "w0m3n" this would be the embedding vector for "w".

A second part of the character vector 201A is a character image vector 215 as discussed above. In this particular example, the character image vector 215 is generated by the application of the character image recognition model 145. In this regard, the character image recognition model 145 receives images for each character (e.g., character images 221 and 223) and generates visual feature data per character image that corresponds to each character of the word (e.g., the word "w0m3n"). The visual feature data may be used herein to refer to a character image vector or other visual feature data generated by the character image recognition model 145. The visual feature data is combined (for example, appended) with the visual character embedding for each character of the word being evaluated.

In some embodiments, to generate the visual feature data, the character image recognition model 145 generates an image dataset. To get a representative image dataset, y number of images of characters may be sampled. The character image recognition model 145 may generate one image dataset per character of the word. In some embodiments, pre-trained features may be used as visual feature data appended to, combined, or otherwise associated with each character received by the character image recognition model 145. The character image recognition model 145 may generate the visual feature data (e.g., the image vector) based on the image dataset generated. The character image recognition model 145 may then associate the visual feature data to each character of the word and input each character and visual feature data into the character encoder layer 280 of the neural network model. Alternatively or additionally, the character image recognition model 145 may adopt AlexNet, VGG, GoogleNet, Deep Residual Learning or other neural network models to generate the visual feature data corresponding to the image.

In some embodiments, linguistic data (e.g., the linguistic data 212) is associated with each character of the word as a part of the character vector 201A. The linguistic data may include a linguistic data vector that corresponds to one or more symbols (e.g., characters) that represent a communication system of a country, region, or area. Representative languages include, but are not limited to, English, Hindi, Chinese, Mandarin, French, Spanish, Arabic, Portuguese, Bengali, Russian, etc. such that one or more characters of the word received may be representative of, for example, one of these languages. In some embodiments, the linguistic data may be generated by a linguistic classifier. In some embodiments, the linguistic classifier may be included within, external to, or otherwise communicatively coupled to the character image recognition model 145. To generate the linguistic data corresponding to each of the characters of the word, a linguistic classifier may generate a linguistic dataset. To get a representative character set, N number of characters may be sampled from various languages. The linguistic classifier may generate one linguistic dataset per character for each language. Alternatively or additionally, to generate the linguistic data (e.g., the linguistic data vector), a linguistic classifier may encode each character corresponding to a language to generate the linguistic data (e.g., the linguistic data vector) corresponding to each of the characters of the word for input into the character encoder layer 280 of the neural network model.

Each character vector 201A-201N is provided to the character encoder layer 280 to generate a word embedding vector. A word embedding may be generated based on at least one of the combined visual feature data, the linguistic data, or each character. For example, the character encoder layer 280 may generate a word embedding using the visual feature data and each character of the word. In some embodiments, the linguistic data is also used.

Figure 4:
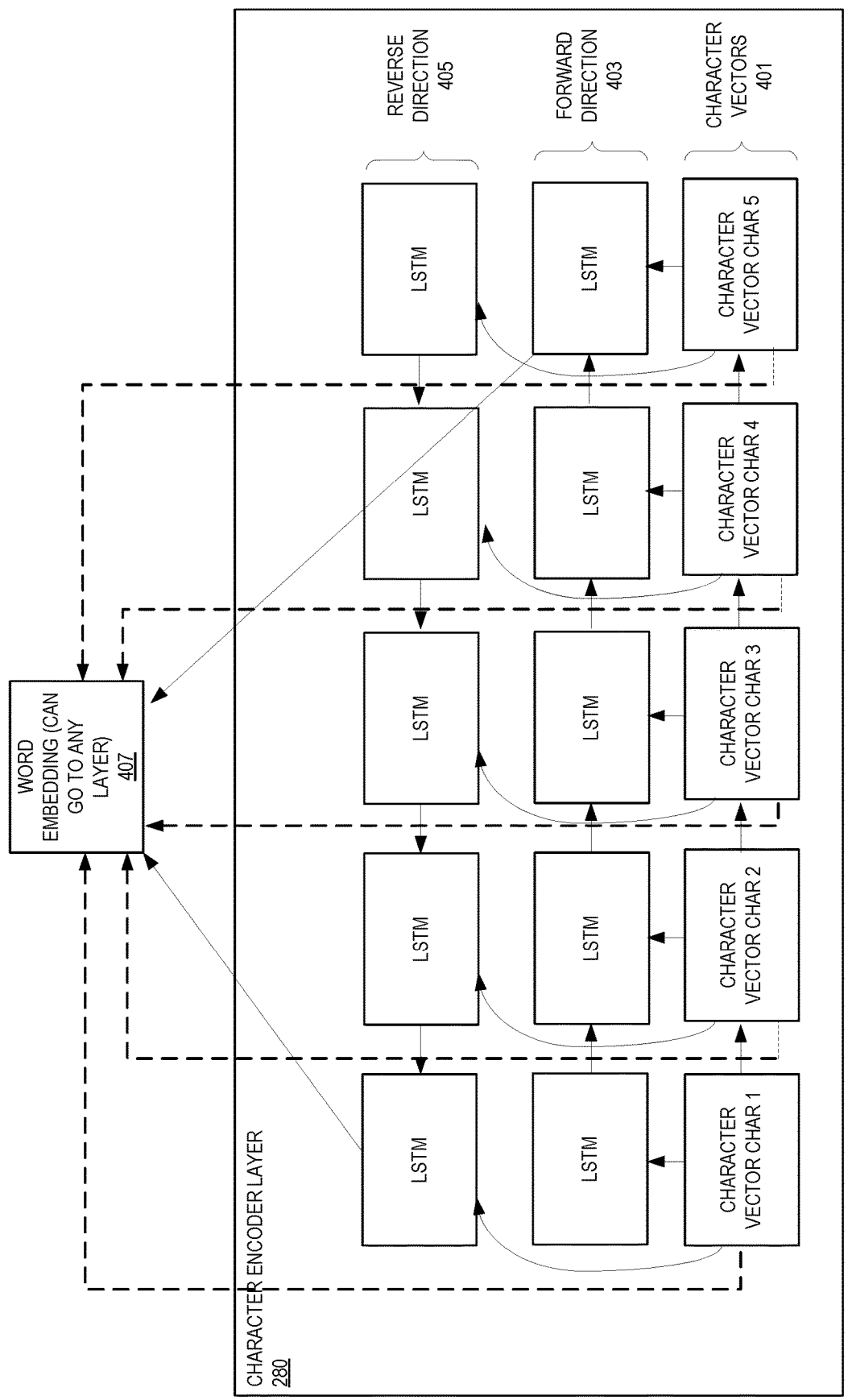
FIG. 4 is a diagram illustrating an example of a character encoder layer that utilizes bidirectional long short-term memory (LSTM) networks according to some embodiments.
Figure 5:
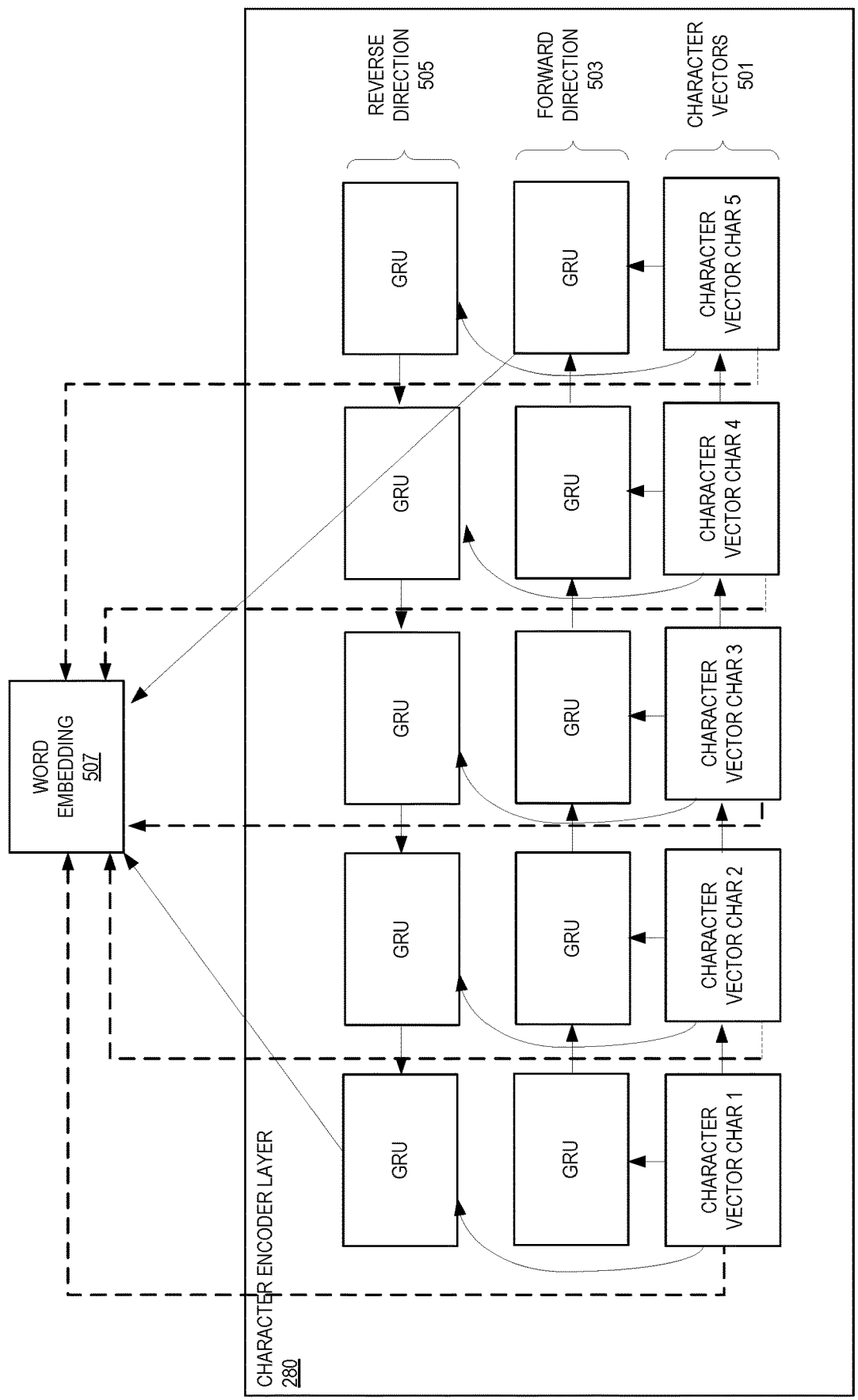
FIG. 5 is a diagram illustrating an example of a character encoder layer that utilizes gated recurrent unit (GRU) networks according to some embodiments.

Examples of character encoder layer 280 are shown with respect to FIGS. 4 and 5. FIG. 4 illustrates embodiments of a character encoder layer that utilizes bidirectional long short-term memory (LSTM) networks. As shown, each of the character vectors 401 is input into a LSTM in a forward direction 403 and a LSTM in a reverse direction 405. The forward direction 403 and reverse directions 405 learn word embeddings by exploiting the prefix and the suffix of each character vector respectively. In some examples, one or more character vectors 401 may skip one or more layers (e.g., one or more layers in the forward direction 403 and/or the reverse direction 405) such that the one or more character vectors may be input directly to form the generated word embedding 407. The output of the final LSTMs in each direction is concatenated to form the generated word embedding 407.

FIG. 5 illustrates embodiments of a character encoder layer that utilizes gated recurrent unit (GRU) networks. As shown, each of the character vectors 501 is input into a GRU in a forward direction 503 and a GRU in a reverse direction 505. The forward direction 503 and reverse directions 505 learn word embeddings using character-level morphology in both prefixes and suffixes. The output of the final GRUs in each direction is concatenated to form the generated word embedding 507. In some examples, one or more character vectors 501 may skip one or more layers (e.g., one or more layers in the forward direction 503 and/or the reverse direction 505) such that the one or more character vectors may be input directly into a GRU to form the generated word embedding 507.

Returning to FIG. 2, the output of the character encoder layer 280 is provided to a word encoder layer 285 along with a corresponding, provided word embedding 270 per word of the text to generate a feature vector. In some embodiments, these embeddings are concatenated. In this example, a word embedding 270 for "w0m3n" is provided along with the generated word embedding. The word encoder layer 285 uses these embeddings to generate a feature vector for each word by exploiting the structure of the sentence. The provided word embedding may be pre-calculated (and looked up) or generated.

Figure 6:
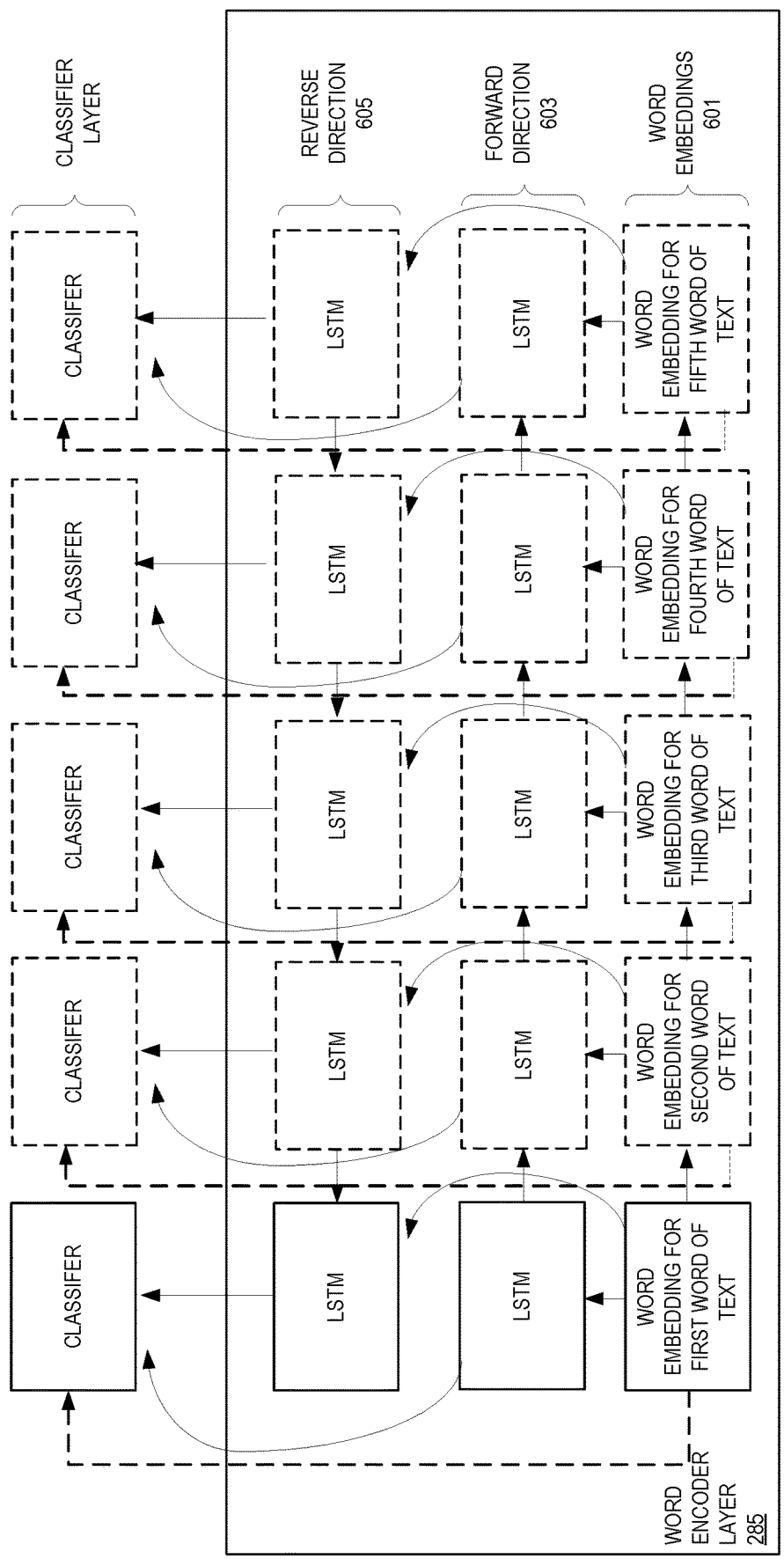
FIG. 6 is a diagram illustrating an example of a word encoder layer that utilizes bidirectional LSTM networks according to some embodiments.
Figure 7:
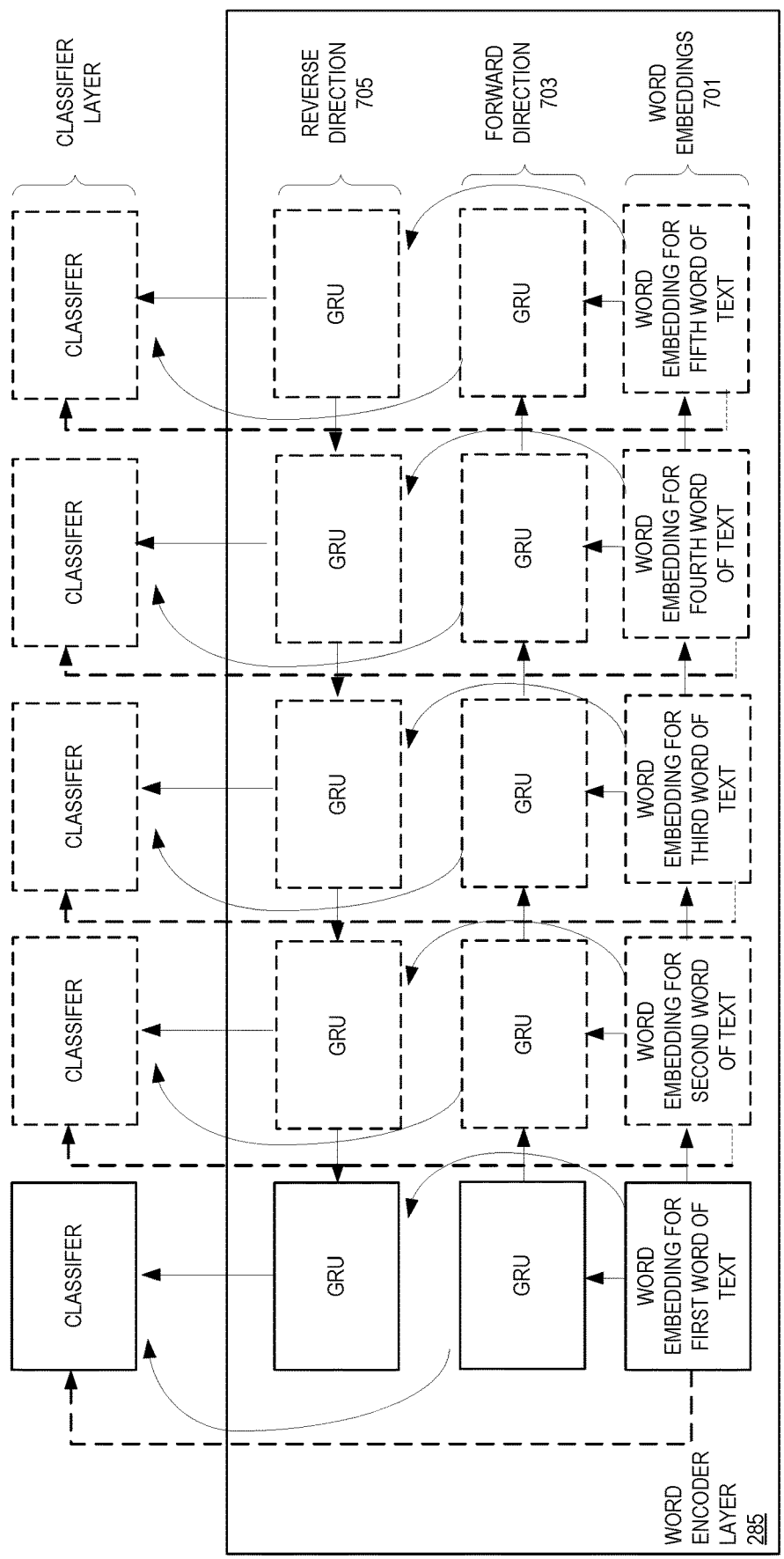
FIG. 7 is a diagram illustrating an example of a word encoder layer that utilizes bidirectional GRU networks according to some embodiments.

Examples of the word encoder layer 285 are shown with respect to FIGS. 6 and 7. FIG. 6 illustrates embodiments of a word encoder layer that utilizes bidirectional LSTM networks. As shown, each of the combined word embeddings 601 is input into a LSTM in a forward direction 603 and a LSTM in a reverse direction 605. Similar to the character encoder layer 280, the forward direction 603 and reverse direction 605 are responsible for generating features using the previous and the next word embeddings of each word. As illustrated, a combined word embedding 601 may skip one or more layers (e.g., one or more LSTM layers in the forward direction 603 and/or the reverse direction 605) such that the combined word embedding 601 may be input directly into the classifier layer.

In a streaming text or other real-time text embodiment, a single word may be evaluated. In such embodiments, the de-obfuscation service may include a latency stride (e.g., the de-obfuscation service may wait for X ms/ns, wherein X may be adaptive based on average rate of words seen over the last Y minutes). The word may then be run through the bidirectional LSTM networks or any other suitable neural networks (e.g., gated recurrent unit neural networks, feed-forward neural networks, convolutional neural networks, etc.) and analyzed.

In other embodiments wherein a single word is evaluated, a uni-directional LSTM may be utilized such as in the forward direction 603 advantageously removing the need to wait after the current word.

FIG. 7 illustrates embodiments of a word encoder layer that utilizes bidirectional GRU networks. As shown, each of the combined word embeddings is input into a GRU in a forward direction 703 and a GRU in a reverse direction 705. Different from the character-level GRU, the word-level GRU aims to generate the context information in the word sequence, such as N-gram patterns and neighbor word dependencies. Such information may be encoded using handcrafted features. As illustrated, a combined word embedding 701 may skip one or more layers (e.g., one or more GRU layers in the forward direction 703 and/or the reverse direction 705) such that the combined word embedding 701 may be input directly into the classifier layer.

Returning again to FIG. 2, the classifier layer 290 (such as a conditional random field layer) uses the generated feature vectors in order to perform de-obfuscation labeling. In some examples, the obfuscation classifier 110 includes a lexicon 295 (e.g., a digital dataset or dictionary of words utilized in one or more languages) or other lookup that is trained to determine abusive language.

Figure 3:
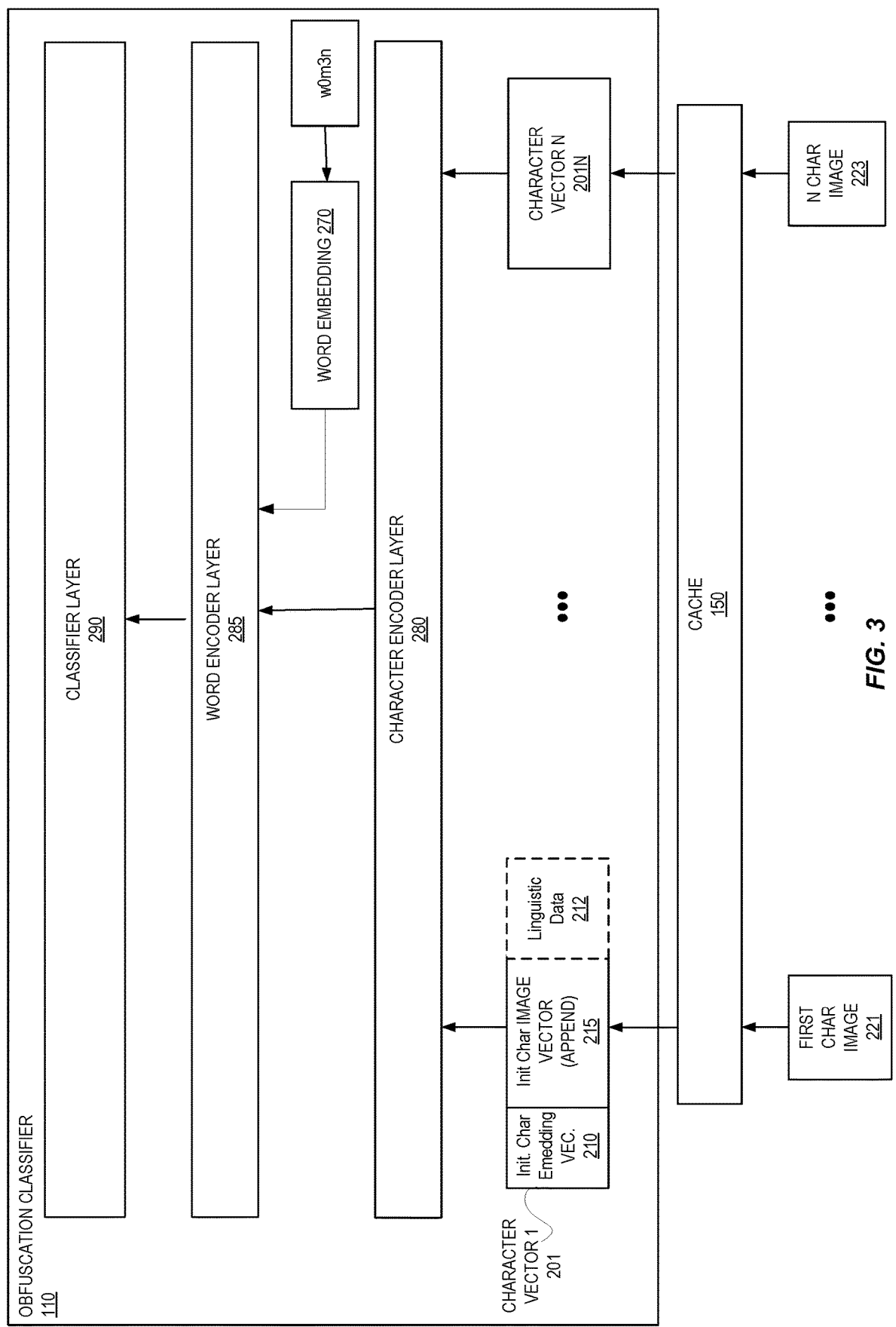
FIG. 3 is a diagram illustrating an example of a de-obfuscation service to detect text obfuscation according to some embodiments.

FIG. 3 is a diagram illustrating aspects of a de-obfuscation service according to some embodiments. In this illustration, instead of using a character image recognition model 145, the character images are looked up in a cache 150. The cache 150 may be pre-populated with known frequently used characters (e.g., from character images 221 and 223) and/or updated when a character is used such that the calculations of the character image recognition model 145 do not need to be repeated unnecessarily.

Note that GRU and LSTM based designs are merely illustrative. For example, CNN-based designs, transformer-based designs, etc. may be used.

Figure 8:
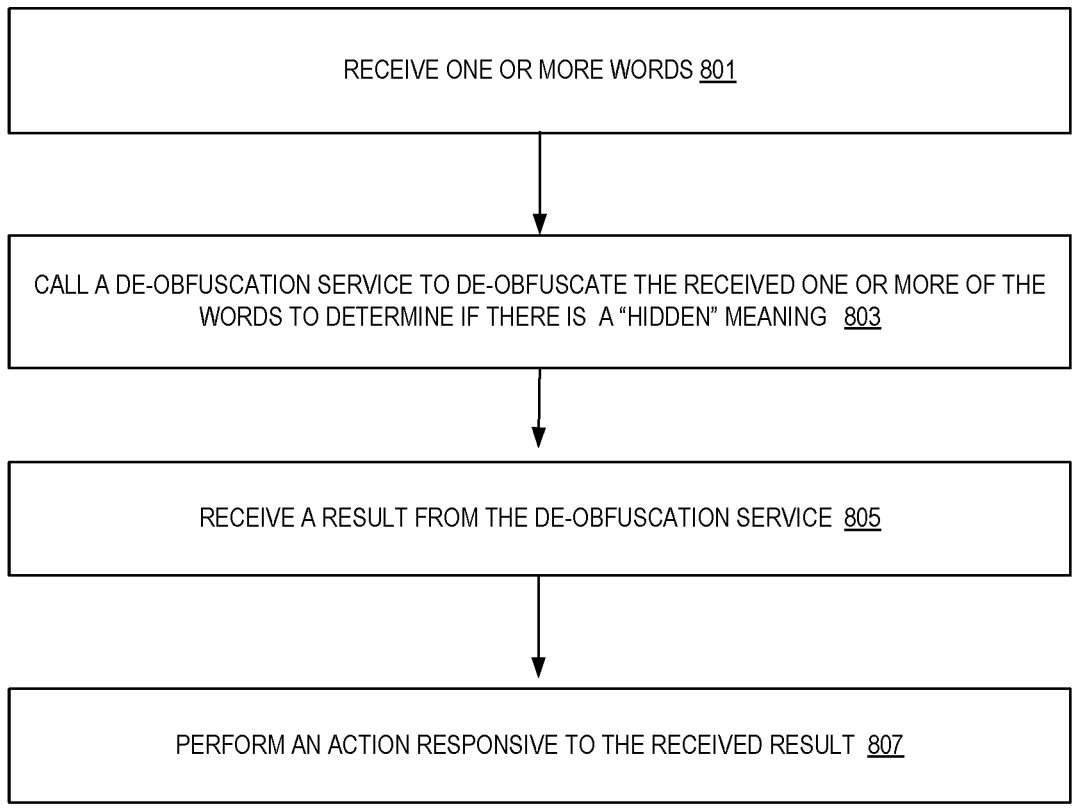
FIG. 8 is a flow diagram illustrating operations of a method for using a detection of text obfuscation according to some embodiments.

FIG. 8 is a flow diagram illustrating operations of a method for using a detection of text obfuscation according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the de-obfuscation service 140.

At 801, one or more words are received. As shown above, text may be provided by user to some application, which may be transmitted by a computing device of the user to the application, e.g., via a public network such as the internet.

These words are then sent to a called de-obfuscation service for evaluation at 803. This call is made to determine if there is a "hidden" meaning in the text. For example, the application may seek to determine whether someone has written something derogatory using "w0m3n" in the text. In some embodiments, the de-obfuscation service is made available by a provider network which may or may not also implement the application.

The de-obfuscation service evaluates the text and provides a result (e.g., a result indicating that the text received is or is not an obscured representation of another word) to the application at 805. For example, the result provided may indicate that "w0m3n" in the text is actually "women."

An action is performed responsive to the received result at 807. Exemplary actions include, but are not limited to: deleting the de-obfuscating word if it is offensive, leaving the de-obfuscated word if it is not offensive, banning an identifier (e.g., a user account ID, IP address, or other device or user identifier) corresponding to the user that provided the offensive text such that the user can no longer use the application 105, warning the user that provided the offensive text, performing additional analysis of the complete user-provided text and/or the context of its use, sending a message to an administrator indicating that the user provided offensive text, etc.

Figure 9:
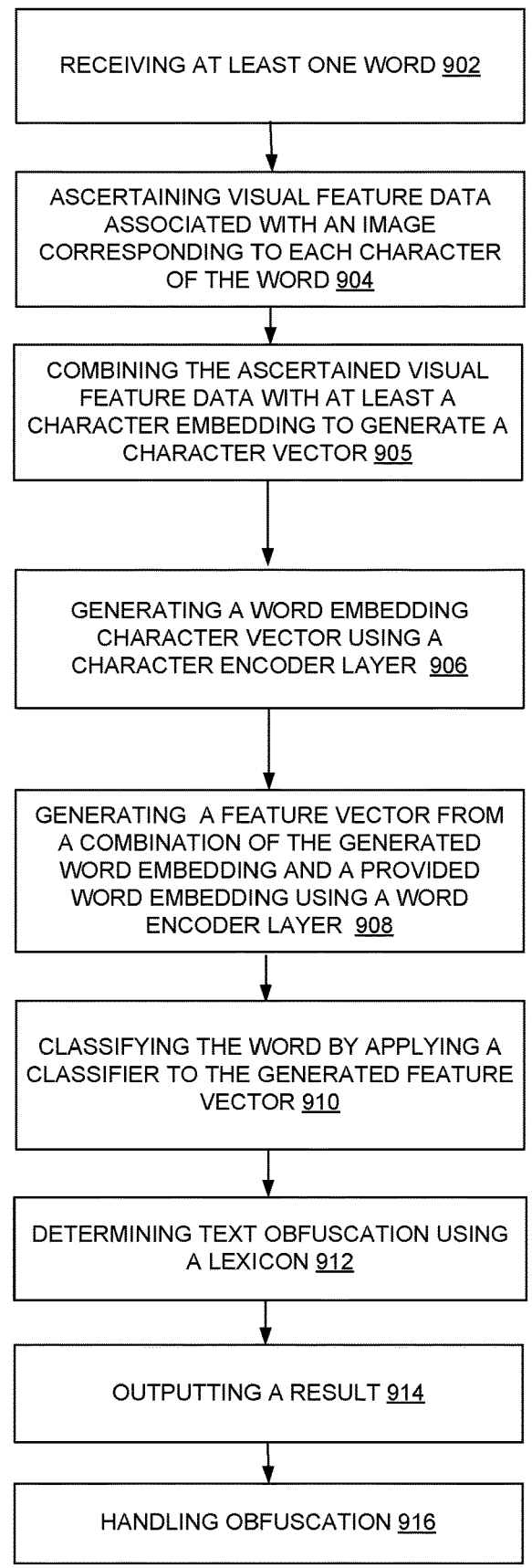
FIG. 9 is a flow diagram illustrating operations of a method for detecting text obfuscation according to some embodiments.

FIG. 9 is a flow diagram illustrating method of a method for detecting text obfuscation according to some embodiments. Some or all of FIG. 9 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, the operations of FIG. 9 are performed in response to a call to a de-obfuscation service.

The method, at block 902, includes receiving at least one word. The word may be input (e.g., keyed in or audibly provided) by a user into a computing device. Further, the word may be a part of a text string.

The method includes performing several operations per word as shown in blocks 904-910. The method further includes, at block 904, ascertaining visual feature data associated with an image corresponding to each character of the word. As noted above, a character image recognition model may receive each character of the word and generate a visual feature data. Alternatively, a cache may be used to store this visual feature data and a lookup into cache performs the ascertaining.

The method further includes, at block 905, combining the ascertained visual feature data with at least a visual character embedding to generate a character vector. The visual character embedding may be calculated, cached, etc. Further, in some embodiments, linguistic data is combined with the ascertained visual feature data and visual character embedding. The linguistic data may be generated by a linguistic classifier from a linguistic dataset per character included in each language/In some embodiments, the combining is performed by concatenation.

In some embodiments, the method further includes generation of metadata corresponding to each of the characters of the word, and generation of the word embeddings using the metadata and each of the characters by using the character encoder layer of the neural network model. The metadata may include one or more typefaces, weights, or a combination thereof of the text in a font image corresponding to each character of the word. The typeface (e.g., a family of fonts) may take the form of a serif typeface, sans serif typeface, script typeface, any other suitable typeface. In some embodiments, the metadata may be generated by a font type classifier from a font dataset. To get a representative character set, x number of characters may be sampled from various typefaces. In some embodiments, a typeface may have variations based on the letter case such that the characters may be divided into lower and uppercase. Alternatively or additionally, the typeface may express a plurality of attributes. For example, the typeface may express attributes such as, but not limited to, regular, narrow, bold, semi-bold, black, italic, etc. The character image recognition model may generate one font dataset image per character for each typeface to generate the font dataset.

The method further includes, at block 906, generating a word embedding from the character vector. This generation is performed using one or more neural networks such as a long short-term memory (LSTM) neural network, feedforward neural network, recurrent neural network, convolutional neural network, etc. In some embodiments, the generation is done at a bi-directional character encoder layer of neural networks.

The method further includes, at block 908, generating feature vectors from a combination of the generated word embedding and a provided word embedding using a word encoder layer. This generation is performed using one or more neural networks such as a long short-term memory (LSTM) neural network, feedforward neural network, recurrent neural network, convolutional neural network, etc. In some embodiments, the word encoder layer uses the embeddings according to a forward and/or reverse direction to generate the feature vector.

The method further includes, at block 910, classifying the word by applying a classifier to the generated feature vector. For example, a CRF may be applied to the generated feature vector. If text has been obfuscated (e.g., abusive language is present), the obfuscated text is identified by applying the classifier to the generated feature vector.

At block 912, in some examples, the classifier provides the text to a lexicon (e.g., a digital dataset of words utilized in one or more languages) or other lookup to determine whether the text has been obfuscated. In some examples, the lexicon may be built or otherwise trained to point the obfuscated text (e.g., "w0m3n") to the intended text (e.g., "women"). The lexicon may include positive examples (e.g., "w0m3n", "133t", "1337", "t3h", and "C@7L0vr") as shown in FIG. 10 and/or negative examples as shown in FIG. 11. The negative examples may be formed by pointing the obfuscated text (e.g., "w0m3n", "133t", and "1337") in the above lexicon to any other language words that are not the intended word (e.g., "ocean", "apple", "headband", and "whom"). The negative examples can be made hard or easy by controlling for the same length, some number of letter overlap, or any other suitable parameter. To train the lexicon, each pairing may be received by the word embedding layer as described herein at 908. The pairings may then be concatenated and pooled to predict a class (e.g., a positive or negative). The positive and negative examples such as, but not limited to, the positive and negative examples above may be utilized to train the classifier with these embeddings. In turn, the word encoder layer learns or is otherwise trained (pre-trained) to know what text (e.g., the obfuscated text such as "w0m3n", etc.) is and/or is not close to the intended text (e.g., the intended word such as "women", etc.). If the text is not there, the classifier may find the closest character. The character may then be replaced by the closet character and received by the lexicon. The character may be taken from the output of character encoder layer and, in turn, provided to the word embedding layer to use for lookup against the dataset of the lexicon.

The method further includes, at block 914, outputting a result of the text obfuscation detection. The result may be provided to an application associated with user interface rendered by, or communicatively coupled, to the computational device to handle the obfuscation at 916. The user interface may then render an output such as, but not limited to, a warning that the word has been obfuscated.

Figure 12:
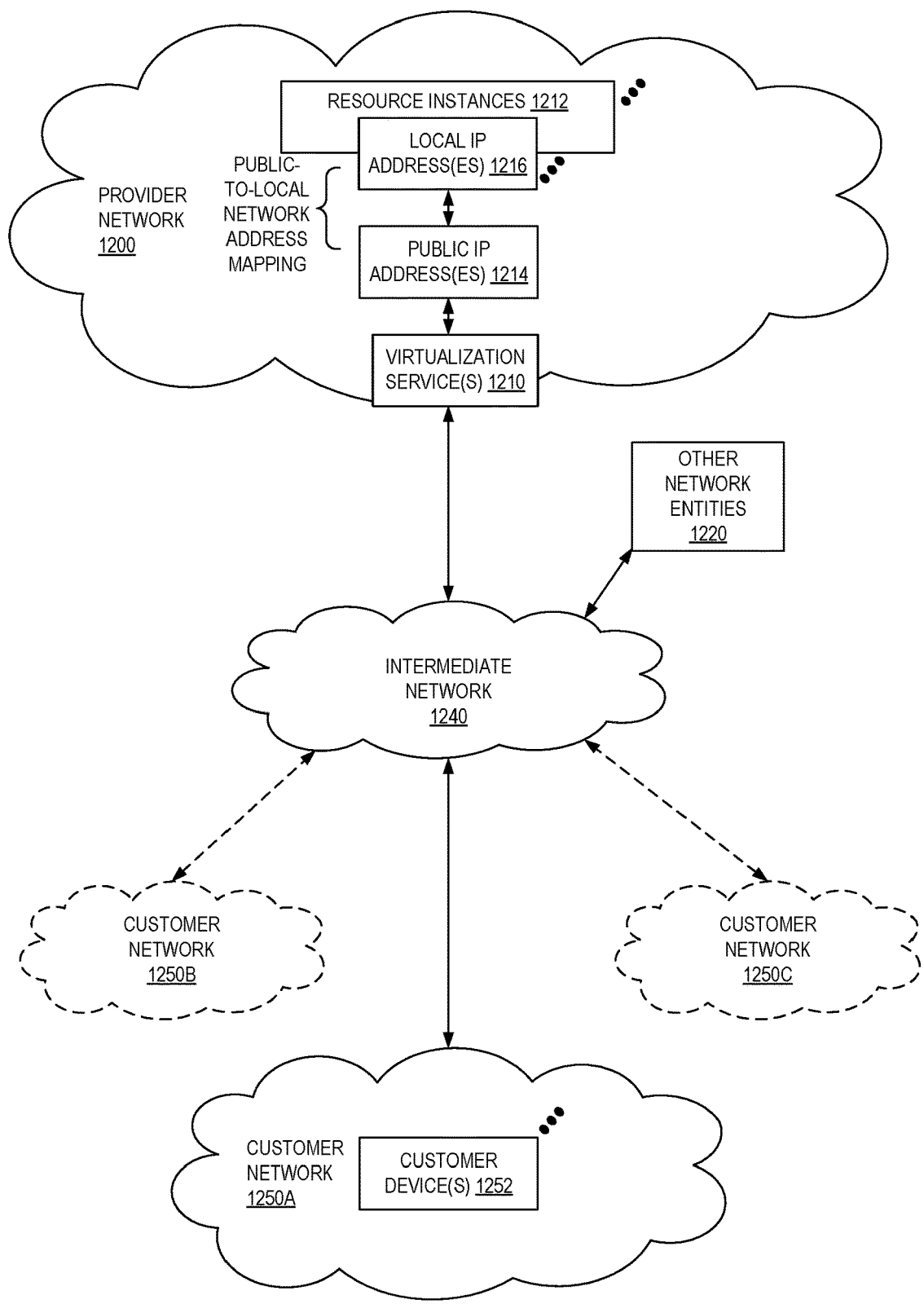
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
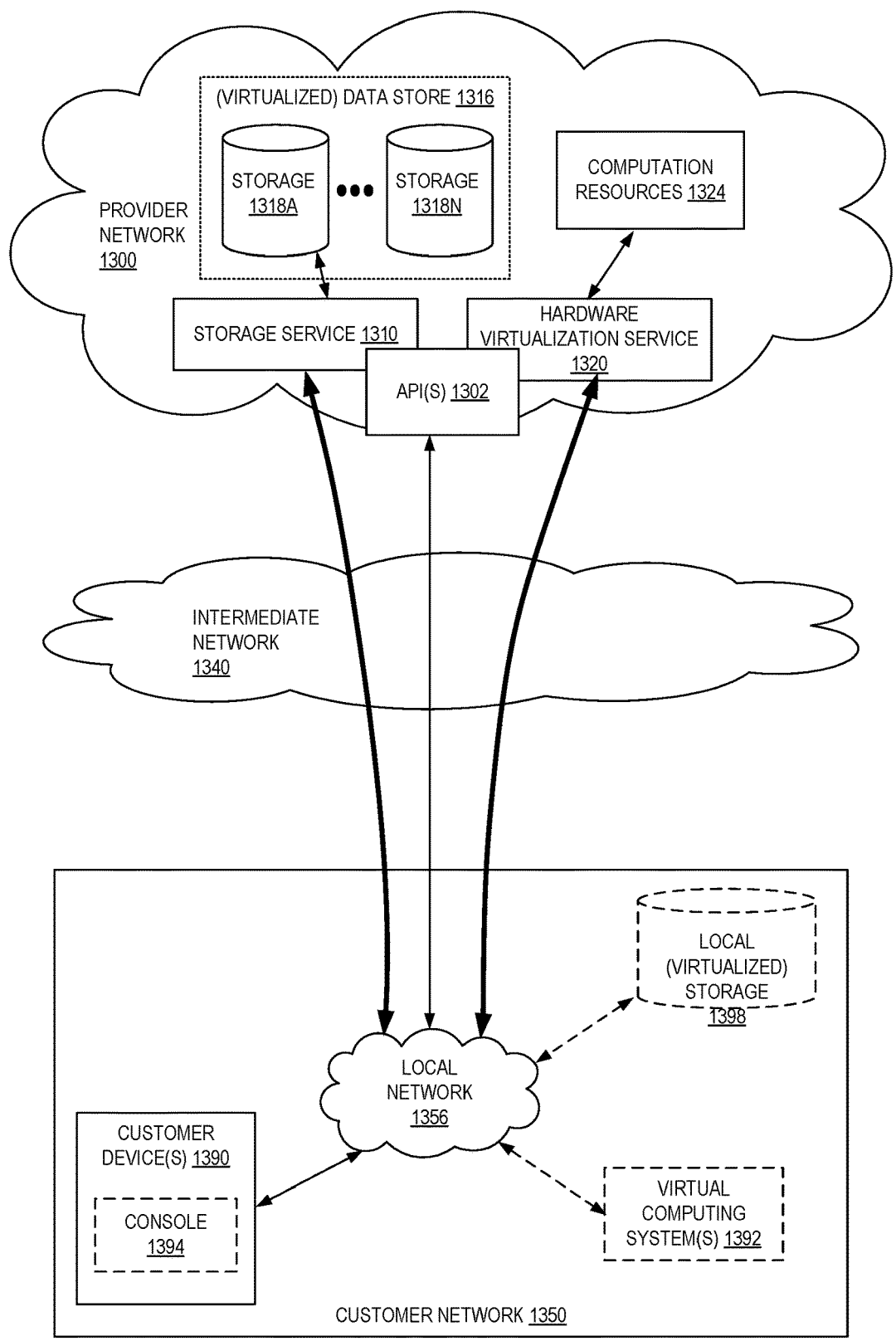
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

Figure 14:
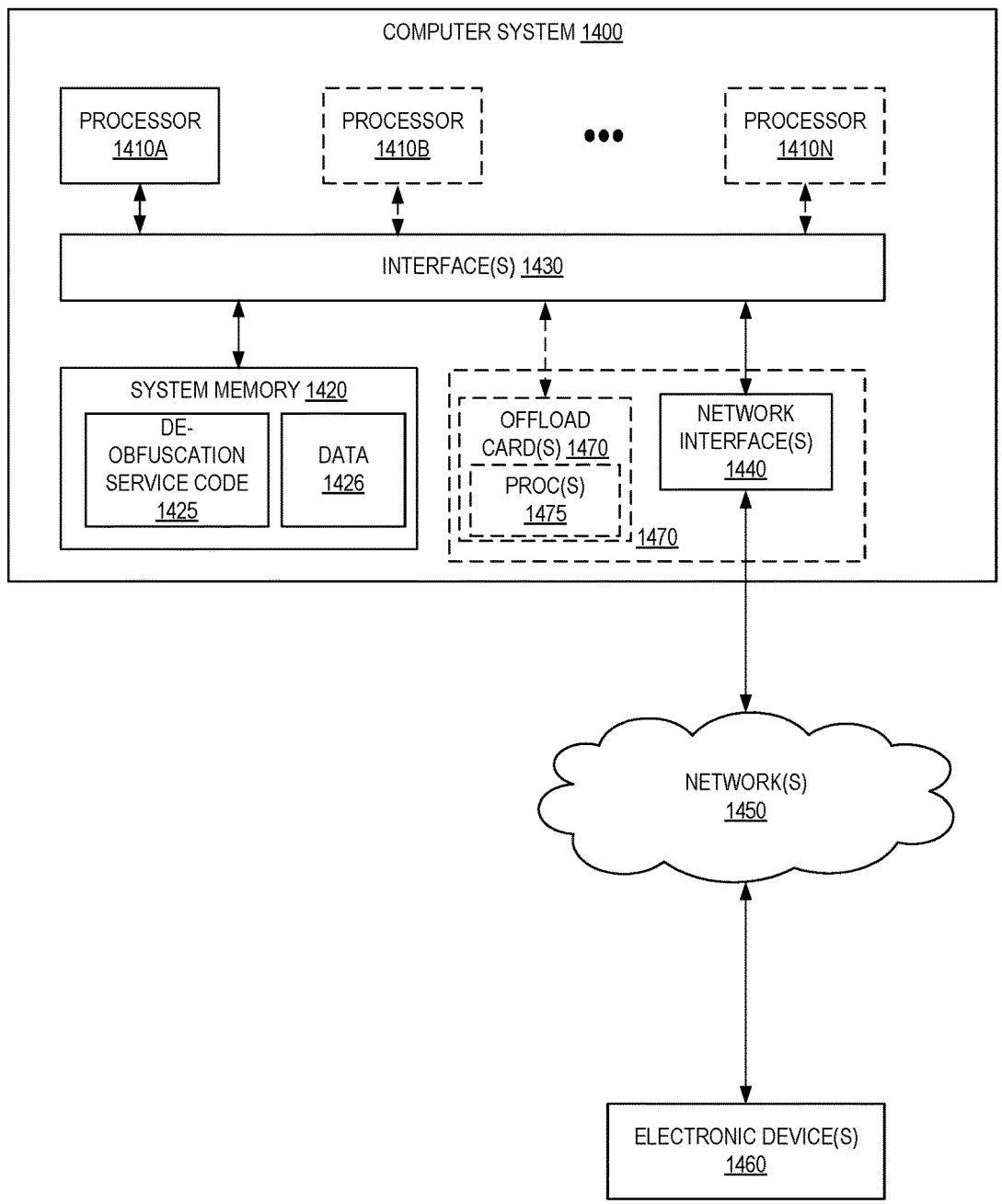
FIG. 14 is a block diagram illustrating an example computer system that may be used in some embodiments.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as de-obfuscation service code 1425 and data 1426.

In some embodiments, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
 receiving a string of user text; and
 per word of the string of user text,
  ascertaining feature data associated with an image corresponding to each character of the word,
  combining the ascertained feature data with a visual character embedding of the character,
  generating a word embedding from the combined ascertained feature data and visual character embedding using a bidirectional character encoder layer of neural networks,
  combining the generated word embedding and a provided word embedding, generating a feature vector from the combined word embeddings by using a bidirectional word encoder layer of network models, classifying the generated feature vector, and detecting potential text obfuscation from the classified, generated feature vector using a lexicon to determine de-obfuscated text closet to the user text.

2. The computer-implemented method of claim 1, wherein the ascertaining the feature data associated with an image corresponding to each character of the word comprises applying a character image recognition model to each image.

3. The computer-implemented method of claim 1, wherein the neural networks are long short-term memory neural networks.

4. A computer-implemented method comprising:

receiving a text word;

ascertaining feature data associated with an image corresponding to each character of the text word;

combining the ascertained feature data with a visual character embedding of the character to generate a character vector;

generating a word embedding from the character vector using a first neural network;

generating a feature vector from the word embedding by combining the generated word embedding and a provided word embedding using a second neural network;

classifying the generated feature vector; and detecting potential text obfuscation from the classified, generated feature vector using a lexicon to determine de-obfuscated text closet to the text word.

5. The computer-implemented method of claim 4, wherein the ascertaining the feature data associated with an image corresponding to each character of the word comprises applying a character image recognition model to each image.

6. The computer-implemented method of claim 4, wherein the neural networks are long short-term memory neural networks.

7. The computer-implemented method of claim 4, wherein the neural networks are gated recurrent unit neural networks, feedforward neural networks, or convolutional neural networks.

8. The computer-implemented method of claim 4, further comprising:

combining linguistic information about the character with the ascertained feature data and the visual character embedding of the character to generate the character vector.

9. The computer-implemented method of claim 4, wherein the first neural network is a part of a bidirectional layer of neural networks.

10. The computer-implemented method of claim 9, further comprising:

generating an indication of text obfuscation; and transmitting the indication of text obfuscation to an entity that requested an analysis of the text word.

11. The computer-implemented method of claim 4, wherein the text word is a part of a string of text and each word of the string of text is to be evaluated for text obfuscation.

12. The computer-implemented method of claim 11, wherein the feature data is ascertained by performing a cache lookup.

13. The computer-implemented method of claim 4, wherein the provided word embedding comes from a lookup table.

14. The computer-implemented method of claim 4, wherein the provided word embedding is dynamically generated.

15. A system comprising:

a text de-obfuscation system implemented by a first one or more electronic devices; and a de-obfuscation service implemented by a second one or more electronic devices, the de-obfuscation service including instructions that upon execution cause the de-obfuscation service to:

receive user text;

per word of the user text, ascertain feature data associated with an image corresponding to each character of the word, combine the ascertained feature data with a visual character embedding of the character, generate a word embedding from the combined ascertained feature data and visual character embedding using a character encoder layer of neural networks, generate a feature vector from the word embedding by combining the generated word embedding and a provided word embedding using a word encoder layer of network models, classify the generated feature vector, and detect potential text obfuscation from the classified, generated feature vector using a lexicon to determine de-obfuscated text closet to the user text.

16. The system of claim 15, wherein the neural networks are structured to generate one or more word embeddings based on the combined ascertained feature data with the visual character embedding and and each of the characters.

17. The system of claim 15, wherein the image comprises one or more alphanumeric characters.

18. The system of claim 15, wherein the de-obfuscation service including instructions that upon execution further cause the de-obfuscation service to:

generate linguistic data corresponding to each of the characters of the word; and generate the word embedding using the linguistic data and each of the characters of the word using the character encoder layer of the neural networks.

19. The system of claim 15, wherein the neural networks are to generate one or more word embeddings based on at least one of the ascertained feature data, linguistic data, or each of the characters.

20. The system of claim 15, wherein the network models are bidirectional.

* * * * *